United States Patent Office 3,285,753
Patented Nov. 15, 1966

3,285,753
METHOD OF PREPARING A POULTRY PRODUCT
Donald V. Schwall, Glen Ellyn, and Alan B. Rogers, Palos Park, Ill., assignors to Armour and Company, Chicago, Ill., a corporation of Delaware
No Drawing. Filed Mar. 23, 1964, Ser. No. 354,118
5 Claims. (Cl. 99—107)

The present invention relates to the preparation of a shaped poultry product made up of a plurality of smaller pieces of chunks of poultry meat which are packed together in log, roll, roast or other form, and which can be cooked with relatively little cook-out of natural juices and can be sliced without falling apart. The method of the present invention is directed particularly to the matter of improving the flavor and aroma of a product of the nature described.

Usual commercial manufacturing procedures for heat-processed meats in cans, logs, or rolls result in considerable losses in water cook-out, which may amount to about 15–30% of the original weight of the poultry meat, varying with the heat treatment employed. Gelatin, wheat gluten, or other materials are sometimes added to the formulation in an effort to hold this water and to hold the meat pieces together. However, the results of such measures leave much to be desired. The poultry meat mass is not continuous and contains gel pockets and layers between the individual meat pieces. The gels not only fail to effectively hold the mass together but are also undesirable from an aesthetic point of view. Moreover, the product usually lacks desired moistness and tenderness.

In copending application Serial No. 352,325, filed March 16, 1964, there is described and claimed the preparation of an improved poultry product which can be cooked with relatively little cook-out of natural juices and which can be sliced into continuous pieces which do not fall apart. Stated in general terms, the process described in said copending application comprises the steps of applying edible metallic salt, such as sodium chloride, to the surfaces of pieces or chunks of poultry meat, agitating or tumbling the said pieces or chunks until a concentration of salt soluble protein is formed on the surfaces thereof, pressing the pieces together, and then cooking. The agitation or tumbling of the poultry pieces in the presence of the salt causes salt soluble proteins, such as myosin and actin, to migrate to the surface of each piece and to concentrate there in the form of a creamy, sticky coating. When the pieces are pressed together in a container, this coating has an adhesive effect and binds the pieces together in a cohesive mass. This effect is very much more pronounced after the product has been cooked, and in fact the pressed and cooked product is extremely similar in appearance, texture and sliceability to a single large unitary piece of poultry meat. The process of said copending application is particularly applicable to poultry meat which has passed through rigor mortis, or, in other words, has passed through the holding or aging period which is required in commercial operations to remove body heat and effect the aging necessary for tenderness in cooking.

The present invention is based in part on the discovery that the product described in said copending application Serial No. 352,325 can be substantially improved from the standpoint of flavor and aroma by adding poultry skin components, without impairing the cohesiveness of the product of its resistance to cook-out of natural juices. The desirable flavor and aroma factors in poultry are concentrated in the skin, and for this reason it is deemed advantageous from a marketing viewpoint to incorporate skin components in poultry products which are fabricated and packed for sale to the consuming public. This is ordinarily done by grinding the skin and dispersing it throughout the product. However, it was not expected that ground-up skin could be incorporated in the product described in said application without interfering with the binding properties of the salt-soluble protein relied upon to maintain cohesion of the poultry meat product. Poultry skin contains substantial proportions of fact which of course has little or no binding properties. Skin also contains collagen which upon cooking breaks down to gelatin which is also low in binding effect. However, it has been found that by grinding poultry skin with small scraps of raw poultry meat to form a paste or batter, and by applying this paste to the pieces of poultry meat in a particular sequence of steps, the anti-binding characteristics of the skin are overcome, and the skin can therefore be added to the product without impairment of its favorable properties.

In its preferred embodiment, therefore, the process of the present invention comprises the steps of slaughtering and dressing poultry, skinning and boning said poultry, applying edible metallic salt, such as sodium chloride, to the surfaces of the pieces of boned poultry, agitating the pieces for a period of time until a concentration of salt-soluble protein is formed on the surfaces, preparing a paste by grinding poultry skin and small poultry pieces, mixing the paste with the previously agitated salted pieces and further agitating the mixture to disperse the paste throughout, and then pressing the mixture in a container and cooking.

The resulting product is substantially improved from the standpoint of flavor and aroma. Moreover, the cohesiveness of the product and its resistance to cook-out losses is not only unimpaired but appears to be improved. The particular sequence of steps, involving first agitating the raw pieces of poultry meat in the presence of salt to extract the salt-soluble protein and then mixing in the paste, is important. If the paste is added first and becomes smeared over the surfaces of the raw poultry pieces, this coating interferes with the extraction of salt-soluble protein and the desired binding effect is not achieved.

This invention is applicable generally to any type of poultry which is regularly slaughtered, processed and sold for its meat. The term poultry includes turkeys, such as toms, hens, breeders, broilers, fryers, and roasting turkeys; chickens, such as hens, roosters, broilers, fryers, and roasting chickens; ducks; geese; and the like. The invention applies to the white or dark meat of poultry, as well as mixtures thereof, and it applies to poultry of any age, although the younger ages are preferred.

In preparing the poultry for use in the process, certain precautions must be observed. It is preferred that slush ice chilled poultry, brought down to a temperature below 40° F., be used. If instead it is desired to use poultry which has been frozen immediately following slaughter, it is preferred that the frozen bird be thawed in refrigerated air not exceeding 40° F., or in running water not exceeding 50° F., before using as raw material in the process. In either case, the prepared bird is boned in the normal manner, at temperatures preferably below 50° F., and the boned raw pieces and chunks used as starting material in the process. The white and dark meat may be collected separately and use in the process separately if an all-white or all-dark end product is desired, or they may be combined in suitable proportions if a combination end product is desired. The smaller scraps and trimmings and the skin are preferred to be collected separately and used in the process in the manner specifically described hereinafter.

The salt to be applied to the surfaces of the poultry meat pieces or chunks may be any edible metallic salt which can form, with the natural moisture in the meat, a solution capable of extracting salt-soluble proteins from the meat to provide a surface coating thereof. Sodium chloride, potassium chloride, and various phosphates may be mentioned as examples. Sodium chloride is preferred because it does not impart undesirable flavors unless used in excessive quantities.

It is preferred to use salt concentrations no greater than 2 or 2½% based on the weight of the meat. Higher concentrations would be effective but would be unacceptable from the standpoint of taste. Below the upper limit of 2 or 2½%, salt concentrations as low as 0.1% have been found effective under certain conditions. For organoleptic reasons, the upper limit may be somewhat lower in the case of the phosphates or potassium chloride. The preferred salt concentration range is between 1 and 2%, with 1.2–1.5% being optimum.

After the salt has been applied to the surfaces of the poultry pieces or chunks, the poultry is subjected to a preliminary mixing step. The mixture is agitated or tumbled for a short period of time until a concentration of salt-soluble protein is formed at the surface of each piece. Any type of mixing, tumbling, or working action which manipulates or rubs the salt onto or into the raw poultry meat surface is suitable. For example, the salted poultry meat may be suitably agitated in a meat mixer of known type, although other obvious means of agitation such as churns, pumps, and the like may also be employed.

The temperature during the preliminary mixing step is preferably held below about 35° F. Temperatures as high as 70° F. have been shown to give some effect, but by far the most efficient extraction of salt-soluble protein takes place at temperatures between about 25° and 35° F. Optimum temperatures are 28–30° F. The preliminary mixing time can be as low as 5 minutes, but usually is in the neighborhood of 10 to 15 minutes.

After the preliminary mixing step, a paste or batter, which has been made by chopping the poultry skin together with raw poultry trimmings or scraps, is added to the mixture, and the agitation is continued for an additional period of time until the paste is thoroughly dispersed throughout the pieces of meat. Ordinarily, this additional mixing will continue for a further 10 or 15 minutes.

The paste or batter is preferably made up with about a 50–50 mixture of skin and meat scraps, since these are the natural proportions which result from the skinning and boning of poultry carcasses. However, the proportions of skin and scrap meat can be varied within wide ranges without detracting materially from their suitability. Thus, for example, the proportion of skin may comprise from 30 to 65% by weight of the paste and still give satisfactory results. A skin proportion of 45 to 55% by weight of the paste is preferred. The paste may be formed by any suitable chopping or cutting apparatus, such as for example the cutting device known in the trade as a "silent cutter." The scrap meat may be any of the small raw trimmings resulting from the boning operation, such as boneless scrap meat, "wing knobs," and the like. Since the skin is light in color, it is sometimes preferred to use only scrap white meat in order that the color of the two components may blend more readily.

In preparing the paste or batter, it is preferred also to incorporate edible metallic salt in the same proportions as included in the raw poultry pieces in the preliminary agitation step. In other words, in preparing the paste, it is usually preferable to add from 0.1 to 2 or 2½% salt, based on the total weight of the paste. However, it is also possible to calculate in advance the amount of salt required for the entire mixture, including both the poultry pieces and the paste, and add this total quantity of salt at the beginning of the process in order to make it available for enhanced extraction power during the preliminary mixing step. In such case, of course, no salt needs to be added in making up the paste. With either approach, it is preferable that the total amount of added salt be within the range from 0.1 to 2 or 2½%, based on the final weight of the product, i.e., the combined weight of poultry pieces and skin in the product.

The paste is preferably added to the poultry meat pieces in proportions such that the amount of paste comprises from about 10 to 15% of the total weight of the mixture. It is possible to increase this to 20 or 25% paste without any significant difference in appearance or behavior of the end product, but as the proportion of paste reaches 30 or 35%, the appearance of the product begins to lose the texture and grain appearance of natural poultry meat and to take on a "luncheon meat" appearance which would be objectionable to some consumers in a product of this nature. The above-named ranges are applicable in the case of a paste made up of a 50–50 mixture of skin and white meat scraps. The limits of these ranges may vary to some extent if greater or lesser quantities of skin are used in the paste.

After the paste is added to the mixture and the agitation continued for an additional period of time to disperse the paste thoroughly through the product, the mixture may be pressed together in containers or cans to form the conventional forms of processed poultry meat such as rolls, logs, roasts, and the like. For example, the mixture from the agitation step may be placed in the mold of a conventional type sausage stuffing machine and stuffed into regular casings under pressure; or it may be pressed into cans or into cooking forms or other type pans for further processing. In any case, it is desirable that pressure of some kind be applied to press the pieces of meat together and allow the adhesive nature of the salt-soluble protein coating to work for the formation of a cohesive mass.

The packed product is then cooked according to conventional practices, or it may be shipped or stored in raw form for cooking at a later time. It is not necessary for the purposes of the present specification to describe in detail the conditions and techniques for the cooking step, since these are merely the usual practices of the industry. Generally speaking, and taking turkey rolls as an example, the product is cooked in cooking tanks to a final temperature in the range of 160–180° F. over a period of time amounting to about 30 minutes per pound of product.

The cooking step is effective in enchancing the binding properties of the salt-soluble protein and in blending the leaves or veins of protein into the meat pieces themselves so that the end product has the appearance and behavior of a unitary cohesive mass with the interleaved veins of protein barely discernible. Although the veins or striations caused by the salt soluble protein are very similar in color, strength, and behavior to the main body of meat, and appear to blend thereinto, their presence nevertheless has a very significant effect, and the resulting cooked product is more juicy and tender.

In a further embodiment of the invention, it has been found possible, without impairment of the end product, to include a substantial portion of cooked poultry pieces or chunks used as starting material in the process. This means that the boning procedure can be carried out more or less on a rough basis and that bones or carcasses resulting from the rough boning step can be cooked to loosen and remove the remaining pieces of meat. These cooked pieces can then be added to the raw pieces, preferably after the preliminary agitation step and at the point in the process where the paste is added. Salting and further agitation of the cooked pieces does not result in extraction of salt-soluble protein to any substantial degree, but the extraction of protein from the raw pieces has been found sufficient to coat both types of meat, as long as the amount of cooked meat does not exceed 50 or 60% by weight of the mixture.

Specific examples illustrative of the invention are set out as follows:

EXAMPLE I

Raw material preparation

Turkeys were slaughtered, dressed, slush ice chilled to a temperature of 35° F., and boned. In the boning operation, the breast meat was carefully removed by hand-boning, care being taken to remove all skin, excess fat, bruises, dark spots, blood clots, pin feathers, gristle, and tendons, and the skin being placed in a separate container. Dark meat was removed carefully from the thigh portion of the leg only, observing the same precautions as in the case of the breast meat. "Wing knobs" were removed and placed in a separate container.

Raw meat chilling 500 lbs. of boned white meat were placed in thin layers on clean trays in a freezer for about 1 hour to bring the temperature down to 28–30° F.

Batter preparation 41 lbs. of skin, 20 lbs. of wing knobs and 21 lbs. of boneless scrap white meat were placed in a prechilled silent cutter, along with 1.9 lbs. of a salt and spice mixture containing 1.2 lbs. of sodium chloride, and the mixture was chopped for 5 minutes. The chopped batter was chilled rapidly to 35° F.

Mixing

The 500 lbs. of white meat were placed in Anco Vacuum Mixer which had been prechilled with ice, and 11.5 lbs. of a salt and spice mixture containing 7.5 lbs. of sodium chloride was sprinkled evenly over the surface of the meat. The mixer was operated for 5 minutes, and then the 85 lbs. of batter was added and the mixing continued for an additional 15 minutes. During the mixing operation, a vacuum of 22 in. was maintained in order to prevent air holes in the end product.

The mixture was then taken from the mixer and placed in the mold of a sausage stuffing machine, and stuffed into Visking No. 8 MP casings, clipped at each end with metal clips, resulting in turkey white meat rolls weighing approximately 9 lbs. each.

The rolls were placed in cooking tanks in a vertical position and cooked for 5½ hours to a final internal meat temperature of 166° F., and this rose to 170° F. before the subsequent cooling step began to take effect.

Upon completion of the cooking step, the water temperature in the cooking tank was rapidly cooled to 50° F. and the rolls kept in this water for 1 hour, followed by 4 hours in air-agitated slush ice water, as a result of which the temperature of the rolls was brought below 40° F. The rolls were than frozen to 0° F., packed into individual boxes, and stored for shipment or for further packaging and labeling.

EXAMPLE II

Ice-packed broiler chickens, having an average weight of 2–3 lbs. eviscerated, were brought to a temperature of 35° F. and raw boned. The white and dark meat from the boning operation were mixed together and brought to a temperature of 28–30° F.

5 lbs. of chicken skin from the boning operation and 5 lbs. of scrap white meat were mixed with .13 lb. of sodium chloride at a temperature of 40° F. and the mixture chopped in a silent cutter for 5 minutes to provide a creamy paste.

56 lbs. of the mixed white and dark meat pieces from the boning operation were placed in a prechilled Anco Vacuum Mixer together with .73 lb. sodium chloride and the mixer was operated for 10 minutes, after which time the 10 lbs. of previously prepared paste was added, and the mixing continued for an additional 4 minutes under vacuum.

After mixing, a portion of the chicken meat was stuffed into casings and cooked to an internal temperature of 165° F. Another portion was pressed into 2-lb. size aluminum pans and roasted in dry heat to an internal temperature of 165° F. Both types of product had the appearance of a unitary cohesive body of meat and held together very effectively on slicing.

EXAMPLE III

Ice-packed broiler chickens, having an average weight of 2–3 lbs. eviscerated, were brought to a temperature of 35° F. and raw boned. The white and dark meat were mixed together and brought to a temperature of 28–30° F.

10 lbs. of chicken skin from the boning operation and 10 lbs. of scrap white meat were mixed with .26 lb. of sodium chloride at a temperature of 40° F. and the mixture chopped in a silent cutter for 5 minutes to provide a creamy paste.

60 lbs. of the mixed white and dark meat pieces from the boning operation were placed in a prechilled Anco Vacuum Mixer together with .78 lb. sodium chloride, and the mixer was operated for 10 minutes, after which time the 20 lbs. of previously prepared paste was added, and the mixing continued for an additional 4 minutes under vacuum.

After mixing, a portion of the chicken meat was stuffed into casings and cooked to an internal temperature of 165° F. Another portion was pressed into 2-lb. size aluminum pans and roasted in dry heat to an internal temperature of 165° F. Both types of products had the appearance of a unitary cohesive body of meat and held together very effectively on slicing.

EXAMPLE IV

The same procedure was followed as in Example II, except that 0.5% by weight of sodium tripolyphosphate was added to both the paste and the raw meat pieces, in place of the sodium chloride.

The resulting cooked and roasted products had the appearance of a unitary cohesive body of chicken meat and held together very effectively on slicing.

EXAMPLE V

Young turkeys weighing 20–24 lbs. were slaughtered, dressed, quick-frozen, and then later thawed in running water at 50° F. and brought down to a temperature of 40° F. with ice.

The turkeys were skinned and then rough boned by removing white meat from the breast and dark meat from the thighs. Following this, the carcasses including the drumsticks were cooked in a kettle of water at 180–190° F. for 1 hour. The carcasses were then chilled and further boned by pulling off the cooked meat.

The raw skin was mixed with an equal portion by weight of raw white meat scraps, 1.5% by weight of sodium chloride was added, and the mixture chopped in a meat chopper to provide a smooth paste or batter.

180 lbs. of raw white meat, chilled to 30° F., was placed in an Anco Vacuum Mixer, which was prechilled with ice, and 4.1 lbs. of a salt and spice mixture containing 2.7 lbs. of sodium chloride was sprinkled evenly over the surface of the meat. The mixer was operated for a period of 10 minutes, during which time the white meat became soft and pliable and covered with a creamy sticky coating. Then 70 lbs. of the paste previously prepared from raw skin and raw white meat scraps were added. Also, 250 lbs. of the chilled cooked meat obtained from the carcasses were mixed in, together with an additional 5.8 lbs. of the salt and spice mixture containing 3.75 lbs. of sodium chloride. The final mixture was agitated for a further 10-minute period.

Part of the resulting mixture was stuffed into moisture-proof casings to provide 3-lb. rolls and then cooked in water for 2 hours and 10 minutes to a final internal temperature of 160° F. Another portion was stuffed into fibrous casings and the resulting rolls roasted in an oven at 190° F. to an internal temperature of 160° F. Both types of products showed substantial improvement in cook-out losses and provided unitary cohesive bodies of poultry meat which did not fall apart on slicing.

What is claimed is:

1. A method of preparing a poultry product, comprising the steps of slaughtering and dressing poultry, skinning and boning said poultry, applying to the surfaces of raw pieces of said boned poultry edible metallic salt which can form, with the natural moisture in the poultry meat, a solution capable of extracting salt-soluble proteins from said meat to provide a surface coating thereof, said edible metallic salt being applied in a concentration within the range of .1 and 2.0% based on the final weight of the product, agitating said pieces at a temperature within the range of 25 to 70° F. until a concentration of salt-soluble protein is formed on the surfaces thereof, thereafter mixing into said coated pieces a paste prepared by grinding poultry skin and small poultry pieces, said paste being incorporated in a proportion within the range of 10 to 35% of paste based on the total weight of the mixture, further agitating the mixture, and pressing said mixture together to form a unitary body characterized by its improved resistance to water cook-out and its retention of intact sliceability after cooking.

2. The method of claim 1 wherein said edible metallic salt is sodium chloride.

3. The method of claim 1 wherein the proportion of skin in said paste is within the range of 30% to 65%, based on the total weight of the paste.

4. A method of preparing a cooked poultry product comprising the steps of slaughtering and dressing poultry, skinning and boning said poultry, applying sodium chloride to the surfaces of said boned poultry pieces in a concentration within the range of about 1.2 to 1.5% based on the weight of the meat, agitating said pieces at a temperature within the range of 25 to 70° F. until a concentration of salt-soluble protein is formed on the surfaces thereof, preparing a paste by grinding poultry skin, small pieces of poultry meat, and sodium chloride in proportions such that the skin comprises about 45–55% by weight of the paste and the sodium chloride comprises about 1.2 to 1.5% by weight, mixing said paste with said previously agitated salted pieces in a proportion within the range of 10 to 35% of paste based on the total weight of the mixture and further agitating the mixture to disperse said paste through the poultry pieces, pressing said mixture together in a container, and cooking.

5. A method of preparing a poultry product, comprising the steps of slaughtering and dressing poultry, skinning and boning said poultry, applying to the surfaces of raw pieces of said boned poultry edible metallic salt which can form, with the natural moisture in the poultry meat, a solution capable of extracting salt-soluble proteins from said meat to provide a surface coating thereof, said edible salt being applied in a concentration within the range of .1 and 2.0% based on the final weight of the product, agitating said pieces at a temperature within the range of 25 to 70° F. until a concentration of salt soluble protein is formed on the surfaces thereof, preparing a paste by grinding poultry skin and small pieces of poultry meat, cooking poultry bones to loosen and remove adhered pieces of poultry meat, mixing said paste and said cooked pieces with said previously agitated salted pieces, said paste being incorporated in a proportion within the range of 10 to 35% of paste based on the total weight of the mixture and said cooked pieces being incorporated in a proportion not greater than 60% of the total weight of the mixture, further agitating the mixture, and pressing said mixture together to form a unitary body characterized by its improved resistance to water cook-out and its retention of intact sliceability after cooking.

References Cited by the Examiner

UNITED STATES PATENTS

| | | | |
|---|---|---|---|
| 1,503,864 | 8/1924 | Vogt | 99—108 |
| 2,622,028 | 12/1952 | Torr | 99—107 |
| 2,822,276 | 2/1958 | Blair et al. | 99—187 |
| 2,874,060 | 2/1959 | Turner et al. | 99—107 X |
| 2,963,376 | 12/1960 | Hogan et al. | 99—107 X |
| 3,024,113 | 3/1962 | Torr | 99—107 |
| 3,076,713 | 2/1963 | Maas | 99—107 |
| 3,173,795 | 3/1965 | Torr | 99—107 X |

A. LOUIS MONACELL, *Primary Examiner.*

HYMAN LORD, *Assistant Examiner.*